United States Patent
Konno et al.

(10) Patent No.: US 11,008,992 B2
(45) Date of Patent: May 18, 2021

(54) ENGINE START CONTROL DEVICE

(71) Applicant: HONDA MOTOR CO., LTD., Tokyo (JP)

(72) Inventors: Ryohei Konno, Wako (JP); Isao Shokaku, Wako (JP); Ryuichi Takao, Wako (JP); Ayumu Nishimiya, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/490,733

(22) PCT Filed: Mar. 16, 2018

(86) PCT No.: PCT/JP2018/010650
§ 371 (c)(1),
(2) Date: Sep. 3, 2019

(87) PCT Pub. No.: WO2018/180650
PCT Pub. Date: Oct. 4, 2018

(65) Prior Publication Data
US 2020/0018279 A1 Jan. 16, 2020

(30) Foreign Application Priority Data

Mar. 28, 2017 (JP) .............................. JP2017-062170

(51) Int. Cl.
*F02N 11/08* (2006.01)
*F02N 11/10* (2006.01)
(Continued)

(52) U.S. Cl.
CPC .......... *F02N 11/0814* (2013.01); *F02N 11/08* (2013.01); *F02N 11/087* (2013.01);
(Continued)

(58) Field of Classification Search
CPC ...... F02N 11/04; F02N 11/08; F02N 11/0814; F02N 11/0866; F02N 11/087;
(Continued)

(56) References Cited

U.S. PATENT DOCUMENTS

| 6,782,860 B2* | 8/2004 | Makajima | ............... | F02B 61/02 |
| | | | | 123/179.3 |
| 2003/0160510 A1* | 8/2003 | Mizutani | ................. | F02N 11/14 |
| | | | | 307/10.1 |

(Continued)

FOREIGN PATENT DOCUMENTS

| DE | 102015009235 A1 | 1/2016 |
| EP | 1321666 A1 | 6/2003 |

(Continued)

OTHER PUBLICATIONS

International Search Report, issued in PCT/JP2018/010650, dated Jun. 19, 2018.

(Continued)

*Primary Examiner* — John M Zaleskas
(74) *Attorney, Agent, or Firm* — Birch, Stewart, Kolasch & Birch LLP

(57) ABSTRACT

An engine start control device that is capable of winding back a crankshaft more quickly at the time of an idling stop includes a swingback controller for performing a swingback control process for reversing a crankshaft when an engine is started by operating a starter switch, a windback reverse controller for performing a windback control process for reversing the crankshaft immediately after the engine is stopped by the idling stop control process, and a motor brake controller for performing a motor brake control process for braking the crankshaft reversed by the windback control process by rotating the crankshaft in the normal direction after the windback control process performed by the windback reverse controller. The value of a motor current sup- (Continued)

plied at the time the crankshaft is reversed by the windback reverse controller is set as a value equal to or larger than the value of a motor current supplied at the time the crankshaft is reversed by the swingback controller.

15 Claims, 8 Drawing Sheets

(51) Int. Cl.
*F02N 19/00* (2010.01)
*F02N 15/00* (2006.01)
*F02N 11/04* (2006.01)

(52) U.S. Cl.
CPC .......... *F02N 11/0866* (2013.01); *F02N 11/10* (2013.01); *F02N 15/00* (2013.01); *F02N 19/005* (2013.01); *F02N 11/04* (2013.01); *F02N 2011/0874* (2013.01); *F02N 2011/0896* (2013.01); *F02N 2019/007* (2013.01); *F02N 2019/008* (2013.01); *F02N 2200/021* (2013.01); *F02N 2200/022* (2013.01); *F02N 2200/044* (2013.01)

(58) Field of Classification Search
CPC ..... F02N 2011/0874; F02N 2011/0896; F02N 19/005; F02N 19/007; F02N 2019/007; F02N 2019/008; F02N 2200/021; F02N 2200/022
See application file for complete search history.

(56) References Cited

U.S. PATENT DOCUMENTS

| | | | | |
|---|---|---|---|---|
| 2004/0000882 | A1* | 1/2004 | Wakitani | F02N 11/0848 318/66 |
| 2005/0229889 | A1* | 10/2005 | Hoevermann | F02N 19/005 123/179.4 |
| 2009/0033252 | A1* | 2/2009 | Smith | H02M 3/33584 318/139 |
| 2010/0250105 | A1* | 9/2010 | Nagatsuyu | F02D 41/061 701/112 |
| 2011/0017165 | A1* | 1/2011 | Osawa | F02N 19/005 123/179.4 |
| 2011/0288705 | A1* | 11/2011 | Kawasaki | B60L 58/20 701/22 |
| 2013/0060455 | A1* | 3/2013 | Kawasumi | F02D 28/00 701/113 |
| 2013/0247871 | A1* | 9/2013 | Teruya | F02N 19/005 123/436 |
| 2015/0377162 | A1* | 12/2015 | Kamioka | F02D 41/042 701/112 |
| 2017/0198675 | A1* | 7/2017 | Capozzella | F02N 11/0862 |

FOREIGN PATENT DOCUMENTS

| | | | |
|---|---|---|---|
| EP | 1 365 145 A2 | 11/2003 | |
| EP | 1365145 A2 * | 11/2003 | ........... F02N 19/005 |
| EP | 2280162 A1 | 2/2011 | |
| EP | 3147496 A1 * | 3/2017 | ........... H02K 11/048 |
| JP | 5-80897 A | 4/1993 | |
| JP | 3039261 U | 7/1997 | |
| JP | 2001-27171 A | 1/2001 | |
| JP | 2003-343404 A | 12/2003 | |
| JP | 2011-21588 A | 2/2011 | |
| WO | WO-2007074074 A1 * | 7/2007 | ........... F02N 11/0814 |
| WO | WO-2015050155 A1 * | 4/2015 | ........... F02D 41/009 |

OTHER PUBLICATIONS

International Preliminary Report on Patentability and Written Opinion of the International Searching Authority for International Application No. PCT/JP2018/010650, dated Oct. 10, 2019, with English translation of the Written Opinion.

Extended European Search Report for European Application No. 18777397.3, dated Feb. 14, 2020.

* cited by examiner

ENGINE START CONTROL DEVICE

TECHNICAL FIELD

The present invention relates to an engine start control device that is capable of quickly winding back a crankshaft in a swingback control process in the event of an idling stop.

BACKGROUND ART

PTL 1 discloses an engine start control device, to be described below, that is capable of shortening the time until a windback control process in an idling stop control process is completed, as described in its abstract.

Specifically, PTL 1 discloses, in paragraph 0048, a control process in which, when the engine starts from a fully stopped state, a swingback reverse duty ratio, e.g., 100%, set by a swingback controller is used, and a windback reverse duty ratio, e.g., 100% or between 90% and 100%, set by an idling-stop-start windback controller is used.

PTL 1 also discloses, in paragraph 0050, a control process of the idling-stop-start windback controller in which, when it is detected that the crankshaft is wound back to a predetermined position, motor brake means reverses an alternating-current generator (ACG) starter motor to apply a motor brake force to the crankshaft, the motor brake means applying the motor brake force stepwise at a plurality of duty ratios. For performing such a motor brake control process, a throttle opening and a crankshaft rotational speed are detected.

According to PTL 1, specifically, in order to restrain "rollback" by which the piston is pushed back under a compressive reaction force to actuate the crankshaft to rotate in a normal direction upon swingback, the motor brake force is applied stepwise at the plural duty ratios, thereby shortening the time spent until the windback control process is completed.

CITATION LIST

Patent Literature

PTL 1: JP 2011-21588A

SUMMARY OF INVENTION

Technical Problem

According to the above prior art, the time spent until the windback control process is completed is shortened by applying the motor brake force stepwise at the plural duty ratios upon swingback, and the time spent from the idling stop to the engine restarting is shortened. However, there have been demands for further efforts to shorten those times. In particular, since the duty ratio at the time of reversing the ACG starter motor before the motor brake force is applied is not necessarily of a large value, there remains room for efforts for a higher-speed duty ratio.

In view of the above problems of the prior art, it is an object of the present invention to provide an engine start control device that is capable of winding back a crankshaft more quickly at the time of an idling stop.

Solution to Problem

To achieve the afore-mentioned object, the present invention has a first feature in that an engine start control device (80) for performing an idling stop control process for automatically stopping an engine (E) when a predetermined condition is satisfied and for reversing a crankshaft (51) after the engine (E) is stopped with a motor (70) that rotates the crankshaft (51) in a normal direction or reverses the crankshaft (51), comprising: a swingback controller (90) for performing a swingback control process for reversing the crankshaft (51) when the engine is started by operating a starter switch (35); a windback reverse controller (101) for performing a windback control process for reversing the crankshaft (51) immediately after the engine is stopped by the idling stop control process; and a motor brake controller (102) for performing a motor brake control process for braking the crankshaft (51) reversed by the windback control process after the windback control process performed by the windback reverse controller (101), wherein a value of a motor current supplied at a time the crankshaft (51) is reversed by the windback reverse controller (101) is set as a value equal to or larger than a value of a motor current supplied at a time the crankshaft (51) is reversed by the swingback controller (90).

The present invention has a second feature in that wherein the motor brake controller (102) performs the motor brake control process by rotating the crankshaft (51) in the normal direction.

The present invention has a third feature in that wherein the motor brake controller (102) performs the motor brake control process by short-circuit braking to short-circuit switching elements that energize the motor (70).

The present invention has a fourth feature in that further comprising: a first battery (216) and a second battery (222), which have rated voltage values different from each other, for applying a drive voltage to the motor (70) that rotates the crankshaft (51) in the normal direction or reverses the crankshaft (51), wherein for energizing the motor (70), either the first battery (216) or the second battery (222) applies the drive voltage to the motor (70).

The present invention has a fifth feature in that further comprising: an overcurrent protection circuit (262) for shunting a current supplied from the windback reverse controller (101) to energize the motor (70) to reverse the crankshaft (51) such that a value of the current supplied to reverse the crankshaft (51) does not exceed a predetermined value.

The present invention has a sixth feature in that further comprising: a motor brake execution determining table (TB) having a motor brake region (R1) and a reverse drive region (R2) that are defined separately from each other depending on a position and a rotational speed of the crankshaft (51), wherein the motor brake controller (102) monitors the position and rotational speed of the crankshaft (51) at each point of time, and starts the motor brake control process when the monitored position and rotational speed are shifted into the motor brake region (R1) in the motor brake execution determining table (TB).

The present invention has a seventh feature in that wherein the motor brake execution determining table (TB) is defined such that the higher the rotational speed is, the farther the position of a boundary across which the reverse drive region (R2) transitions to the motor brake region (R1) becomes from a predetermined position corresponding to a compression-stroke top dead center of the engine (E).

The present invention has an eighth feature in that further comprising: a stopped position adjustment controller (103) for restraining rollback of the crankshaft (51) by reversing the crankshaft (51) if it is determined that the crankshaft (51)

rolls back in the normal direction after the motor brake control process performed by the motor brake controller (102) is finished.

The present invention has a ninth feature in that wherein the windback reverse controller (101) changes a value of a motor current supplied to reverse the crankshaft (51) to a smaller value if it is determined that the position of the crankshaft (51) approaches the compression-stroke top dead center of the engine (E) when the crankshaft (51) is reversed.

Effects of Invention

According to the first feature, An engine start control device (80) for performing an idling stop control process for automatically stopping an engine (E) when a predetermined condition is satisfied and for reversing a crankshaft (51) after the engine (E) is stopped with a motor (70) that rotates the crankshaft (51) in a normal direction or reverses the crankshaft (51), comprising: a swingback controller (90) for performing a swingback control process for reversing the crankshaft (51) when the engine is started by operating a starter switch (35); a windback reverse controller (101) for performing a windback control process for reversing the crankshaft (51) immediately after the engine is stopped by the idling stop control process; and a motor brake controller (102) for performing a motor brake control process for braking the crankshaft (51) reversed by the windback control process after the windback control process performed by the windback reverse controller (101), wherein a value of a motor current supplied at a time the crankshaft (51) is reversed by the windback reverse controller (101) is set as a value equal to or larger than a value of a motor current supplied at a time the crankshaft (51) is reversed by the swingback controller (90). Therefore, by setting the value of a current supplied to reverse the crankshaft in the windback control process at the time the idling stop control process is carried out, as a large value equal to or larger than the value of a current supplied to reverse the crankshaft in the windback control process at the time the swingback control process is carried out, unlike the conventional art, it is possible to wind back the crankshaft more earlier in an idling stop. By further performing the motor brake control process, the crankshaft that is largely reversed in the windback control process at the time the idling stop control process is carried out is braked to prevent the crank position from going beyond the compression-stroke top dead center.

According to the second feature, wherein the motor brake controller (102) performs the motor brake control process by rotating the crankshaft (51) in the normal direction. Therefore, by carrying out the motor brake control process by rotating the crankshaft in the normal direction, it is possible to stop the crankshaft easily at a predetermined position.

According to the third feature, wherein the motor brake controller (102) performs the motor brake control process by short-circuit braking to short-circuit switching elements that energize the motor (70). Therefore, by carrying out the motor brake control process by performing short-circuit braking, it is possible to stop the crankshaft easily at a predetermined position.

According to the fourth feature, a first battery (216) and a second battery (222), which have rated voltage values different from each other, for applying a drive voltage to the motor (70) that rotates the crankshaft (51) in the normal direction or reverses the crankshaft (51), wherein for energizing the motor (70), either the first battery (216) or the second battery (222) applies the drive voltage to the motor (70). Therefore, since the degree of freedom is rendered higher by allowing either the first battery (216) or the second battery (222), rather than a single battery, to apply a drive voltage, the magnitude relation between drive currents can be set with greater ease.

According to the fifth feature, an overcurrent protection circuit (262) for shunting a current supplied from the windback reverse controller (101) to energize the motor (70) to reverse the crankshaft (51) such that a value of the current supplied to reverse the crankshaft (51) does not exceed a predetermined value. Therefore, the value of a motor current supplied to reverse the crankshaft at the time the idling stop control process is carried out is prevented from being an excessive value.

According to the sixth feature, a motor brake execution determining table (TB) having a motor brake region (R1) and a reverse drive region (R2) that are defined separately from each other depending on a position and a rotational speed of the crankshaft (51), wherein the motor brake controller (102) monitors the position and rotational speed of the crankshaft (51) at each point of time, and starts the motor brake control process when the monitored position and rotational speed are shifted into the motor brake region (R1) in the motor brake execution determining table (TB). Therefore, By starting the motor brake control process at an appropriate timing depending on the position and rotational speed of the crankshaft (51) by referring to the motor brake execution determining table (TB), it is possible to complete windback in an idling stop at an appropriate position close to the compression-stroke top dead center.

According to the seventh feature, wherein the motor brake execution determining table (TB) is defined such that the higher the rotational speed is, the farther the position of a boundary across which the reverse drive region (R2) transitions to the motor brake region (R1) becomes from a predetermined position corresponding to a compression-stroke top dead center of the engine (E). Therefore, the higher the rotational speed of the crankshaft (51) is, the earlier the timing at which the motor brake control process is started is. It is thus possible to complete windback in an idling stop at an appropriate position close to the compression-stroke top dead center.

According to the eighth feature, a stopped position adjustment controller (103) for restraining rollback of the crankshaft (51) by reversing the crankshaft (51) if it is determined that the crankshaft (51) rolls back in the normal direction after the motor brake control process performed by the motor brake controller (102) is finished. Therefore, rollback can be restrained.

According to the ninth feature, wherein the windback reverse controller (101) changes a value of a motor current supplied to reverse the crankshaft (51) to a smaller value if it is determined that the position of the crankshaft (51) approaches the compression-stroke top dead center of the engine (E) when the crankshaft (51) is reversed. Therefore, the crank position is prevented from going beyond the compression-stroke top dead center at the time the crankshaft is reversed.

DESCRIPTION OF EMBODIMENTS

Figure 1:
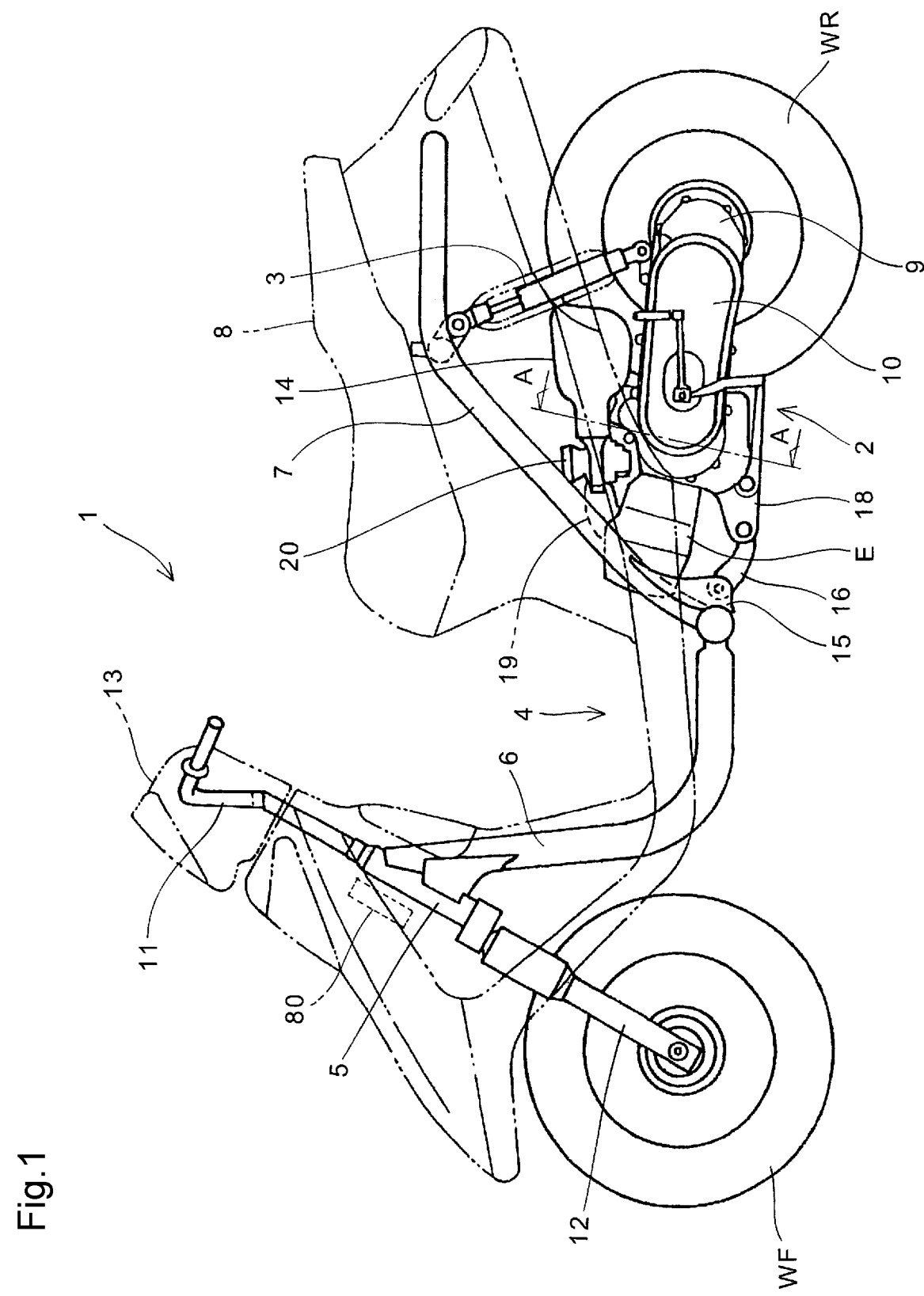
FIG. 1 is a side elevational view of a scooter-type motorcycle to which an engine start control device according to the embodiment of the present invention is applied.

A preferred embodiment of the present invention will hereinafter be described in detail below with reference to the drawings. FIG. 1 is a side elevational view of a scooter-type motorcycle 1 to which an engine start control device according to the embodiment of the present invention is applied. The motorcycle 1 has a front vehicle body portion and a rear vehicle body portion that are interconnected by a low floor 4. The motorcycle 1 includes a vehicle body frame made up mainly of a downtube 6 and a main pipe 7. A seat 8 is disposed above the main pipe 7.

The engine start control device according to the present invention is applicable to not only the scooter-type motorcycle 1 and other motorcycles, but also three-wheeled vehicles, four-wheeled vehicles, and so on. In the description that follows, the vehicle that incorporates the engine start control device according to the present invention will be described as a motorcycle.

A handle 11 is rotatably supported on a head pipe 5 and extends upwardly. The handle 11 has a lower portion to which there is attached a front fork 12 with a front wheel WF rotatably supported thereon. A handle cover 13 that doubles as an instrumental panel is mounted on an upper portion of the handle 11. An electronic control unit (ECU) 80 as the engine start control device is disposed on a front portion of the head pipe 5.

The downtube 6 has a rear end from which the main pipe 7 rises, and a bracket 15 projects from the rear end of the downtube 6. A hanger bracket 18 of a swing unit 2 is swingably supported on the bracket 15 by a link 16.

A four-cycle single-cylinder engine E is disposed on a front portion of the swing unit 2. A continuously variable transmission 10 is disposed behind the engine E. A rear wheel WR is supported on an output shaft of a speed reducer mechanism 9. A rear shock unit 3 is interposed between an upper end of the speed reducer mechanism 9 and a bent portion of the main pipe 7. Above the swing unit 2, there are disposed a throttle body 20 of an fuel injection device connected to an intake pipe 19 extending from the engine E and an air cleaner 14.

Figure 2:
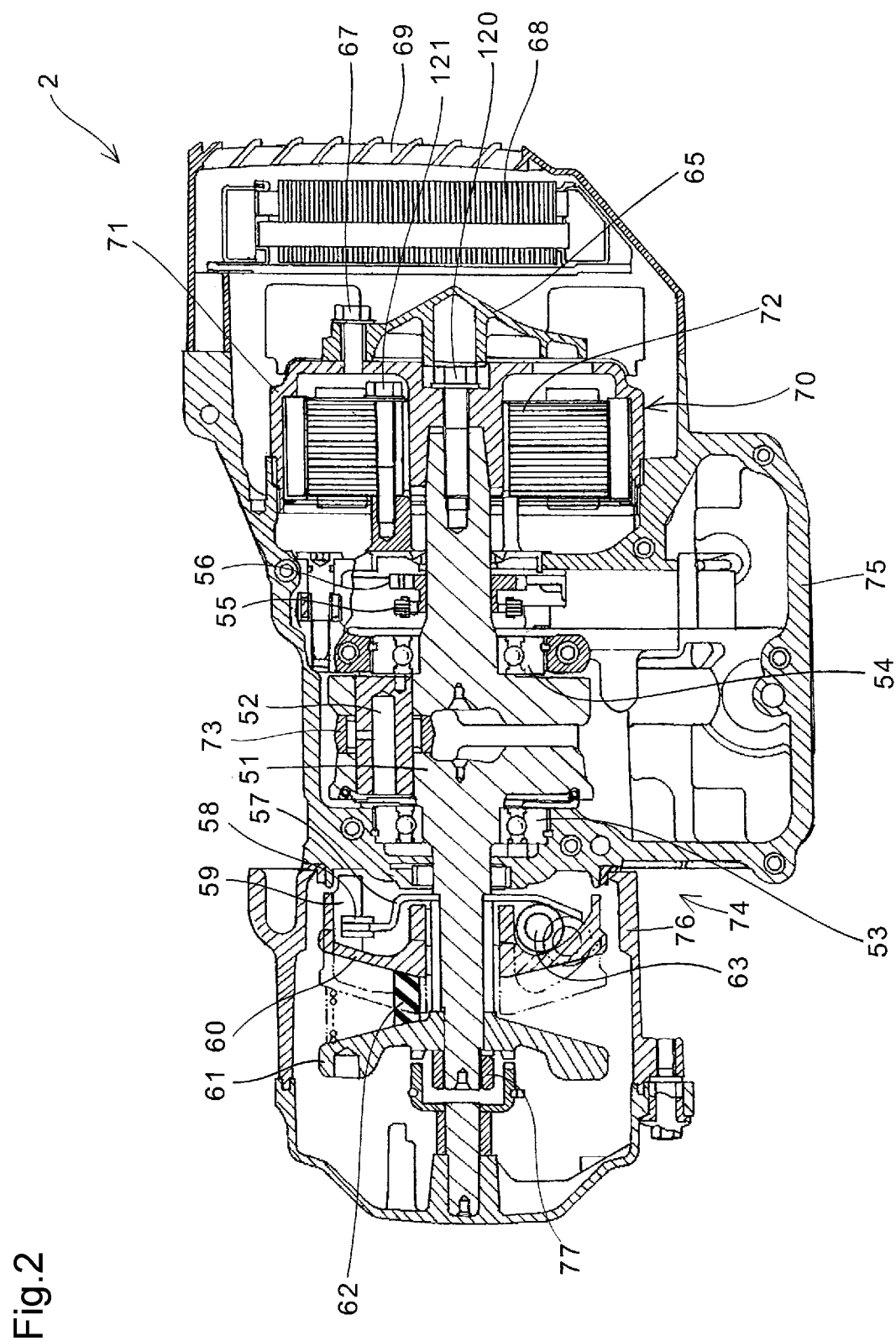
FIG. 2 is a cross-sectional view taken along line A-A of FIG. 1.

FIG. 2 is a cross-sectional view taken along line A-A of FIG. 1. The swing unit 2 has a crankcase 74 made up of a right case 75 on a right side with respect to the widthwise directions of the vehicle and a left case 76 on a left side with respect to the widthwise directions of the vehicle. A crankshaft 51 is rotatably supported on the crankcase 74 by bearings 53 and 54 fixed thereto. A connecting rod 73 is connected to the crankshaft 51 by a crankpin 52.

The left case 76 doubles as a transmission chamber case. A belt drive pully made up of a movable pully half 60 and a fixed pulley half 61 is mounted on a left end portion of the crankshaft 51. The fixed pulley half 61 is fastened to the left end portion of the crankshaft 51 by a nut 77. The movable pully half 60 is splined to the crankshaft 51 and axially movable thereon. A V-belt 62 is disposed between and trained around the pulley halves 60 and 61.

A ramp plate 57 is fixed to the crankshaft 51 on the right side of the movable pulley half 60. A slide piece 58 mounted on an outer peripheral end portion of the ramp plate 57 engages a ramp plate slide boss 59 extending axially from an outer peripheral end of the movable pulley half 60. The ramp plate 57 has a tapered surface on an outer peripheral portion thereof that is inclined toward the movable pulley half 60 in a radially outward direction. A plurality of weight rollers 63 are accommodated between the tapered surface and the movable pulley half 60.

As the rotational speed of the crankshaft 51 increases, the weight rollers 63 are moved radially outwardly by centrifugal forces. The movable pulley half 60 is now moved to the left in FIG. 2 toward the fixed pulley half 61. As a result, the V-belt 62 sandwiched between the pulley halves 60 and 61 is moved radially outwardly, increasing the diameter of the trained portion of the V-belt 62. A driven pulley, not illustrated, around which the V-belt 62 is also trained is disposed in a rear portion of the swing unit 2. The diameter of the portion of the V-belt 62 that is trained around the driven pulley is variable depending on the pulley halves 60 and 61 thus acting together. Drive power from the engine E is automatically adjusted by the above belt transmitting mechanism and transmitted through a centrifugal clutch, not illustrated, and the speed reducer mechanism 9 (see FIG. 1) to the rear wheel WR.

The right case 75 houses therein an ACG starter motor 70 that is a starter motor and AC generator combination. The ACG starter motor 70 includes an outer rotor 71 fixed to a tapered tip end portion of the crankshaft 51 by a mounting bolt 120 and a stator 72 disposed in the outer rotor 71 and fixed to the right case 75 by a mounting bolt 121. A blower fan 65 is fixed to the outer rotor 71 by a mounting bolt 67, and a radiator 68 and a cover member 69 having a plurality of slits defined therein are mounted rightwardly of the blower fan 65 as illustrated.

A sprocket 55 with a cam chain trained therearound for actuating a camshaft, not illustrated, is fixed to the crankshaft 51 between the ACG starter motor 70 and the bearing 54. The sprocket 55 is integrally formed with a gear 56 for transmitting power to an oil pump, not illustrated, for circulating engine oil.

Figure 3:
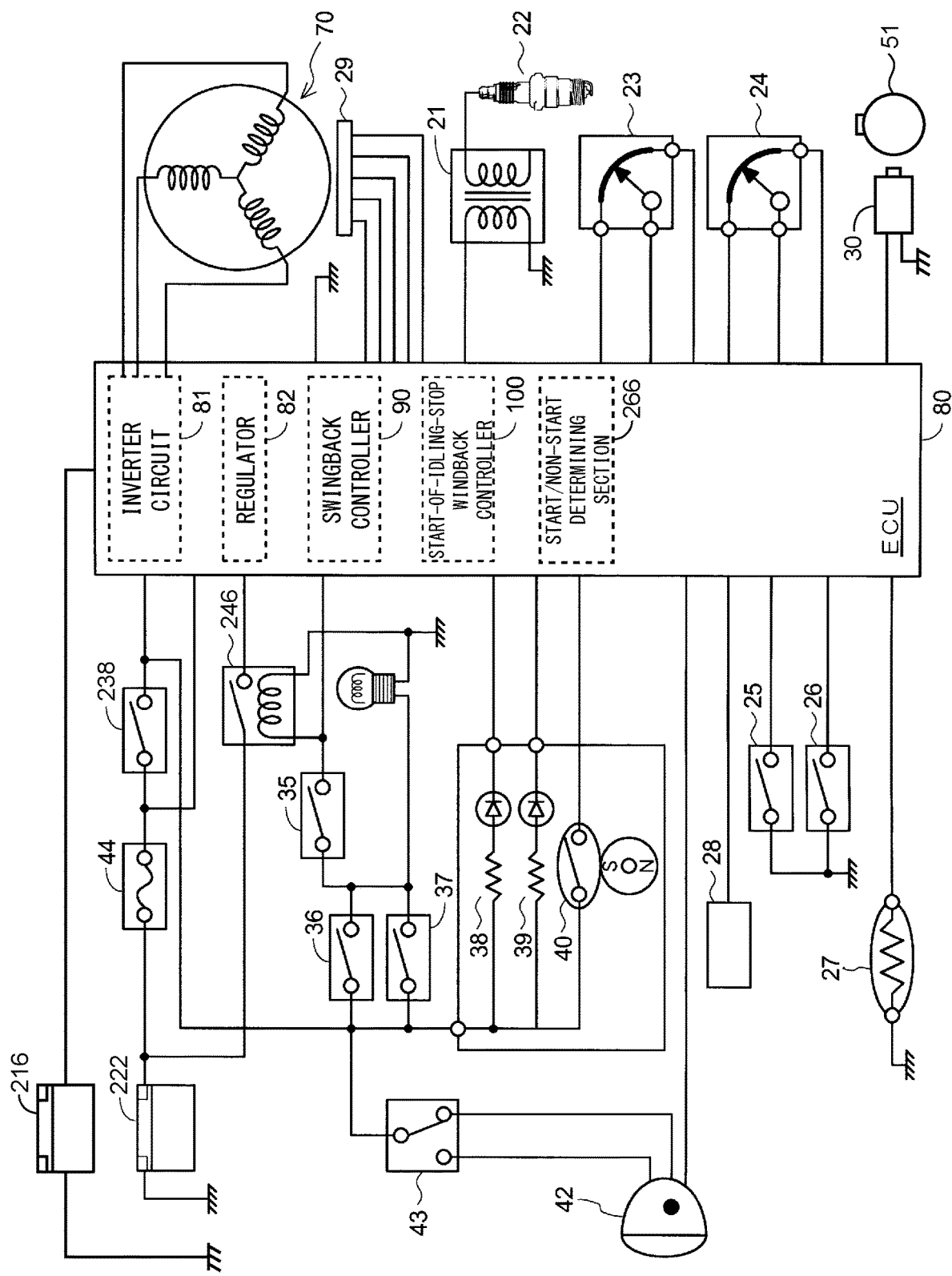
FIG. 3 is a block diagram of a major portion of a control system for the ACG starter motor.

FIG. 3 is a block diagram of a major portion of a control system for the ACG starter motor 70. Those parts which are identical or equivalent to those described above are denoted by identical reference signs. The ECU 80, i.e., the engine start control device 80, includes an inverter circuit 81 constructed as a full-wave rectifying bridge circuit for full-wave rectifying three-phase alternating currents of the ACG starter motor 70, a regulator 82 for limiting the output of the inverter circuit 81 to a predetermined regulated voltage, i.e., a regulator operating voltage of 14.5 V, for example, a swingback controller 90 for reversing the crankshaft 51 to a predetermined position when the engine is to be started, a start-of-idling-stop windback controller 100 for reversing the crankshaft 51 to a predetermined position at the start of an idling stop, and a start/non-start determining section 266. Details of control processes performed by the above components will be described later.

To the ECU 80, there are connected an fuel injection device 28, a motor angle sensor 29, a spark ignition coil 21, a throttle opening sensor 23, a fuel sensor 24, a seat switch 25 for detecting a seated state of the rider, an idling stop control process permission switch 26, a coolant temperature sensor 27, and an ignition pulser 30. Detected signals from these components are input to the ECU 80. A spark ignition plug 22 is connected to the secondary side of the spark ignition coil 21.

To the ECU 80, there are also connected a starter relay 246, a starter switch 35, stop switches 36 and 37, a standby indicator 38, a fuel indicator 39, a vehicle speed sensor 40, and a headlight 42. The headlight 42 is combined with a dimmer switch 43. These components are supplied with electric power from a second battery 222 through a main fuse 44 and a main switch 238.

An arrangement for supplying electric power to the ECU 80 for energizing the ACG starter motor 70 is of a hybrid configuration where electric power is supplied from either one of the second battery 222 and a first battery 216 that have different rated voltage values depending on the decision made by the start/non-start determining section 266. Details of the hybrid configuration will be described below with reference to FIG. 4.

Figure 4:
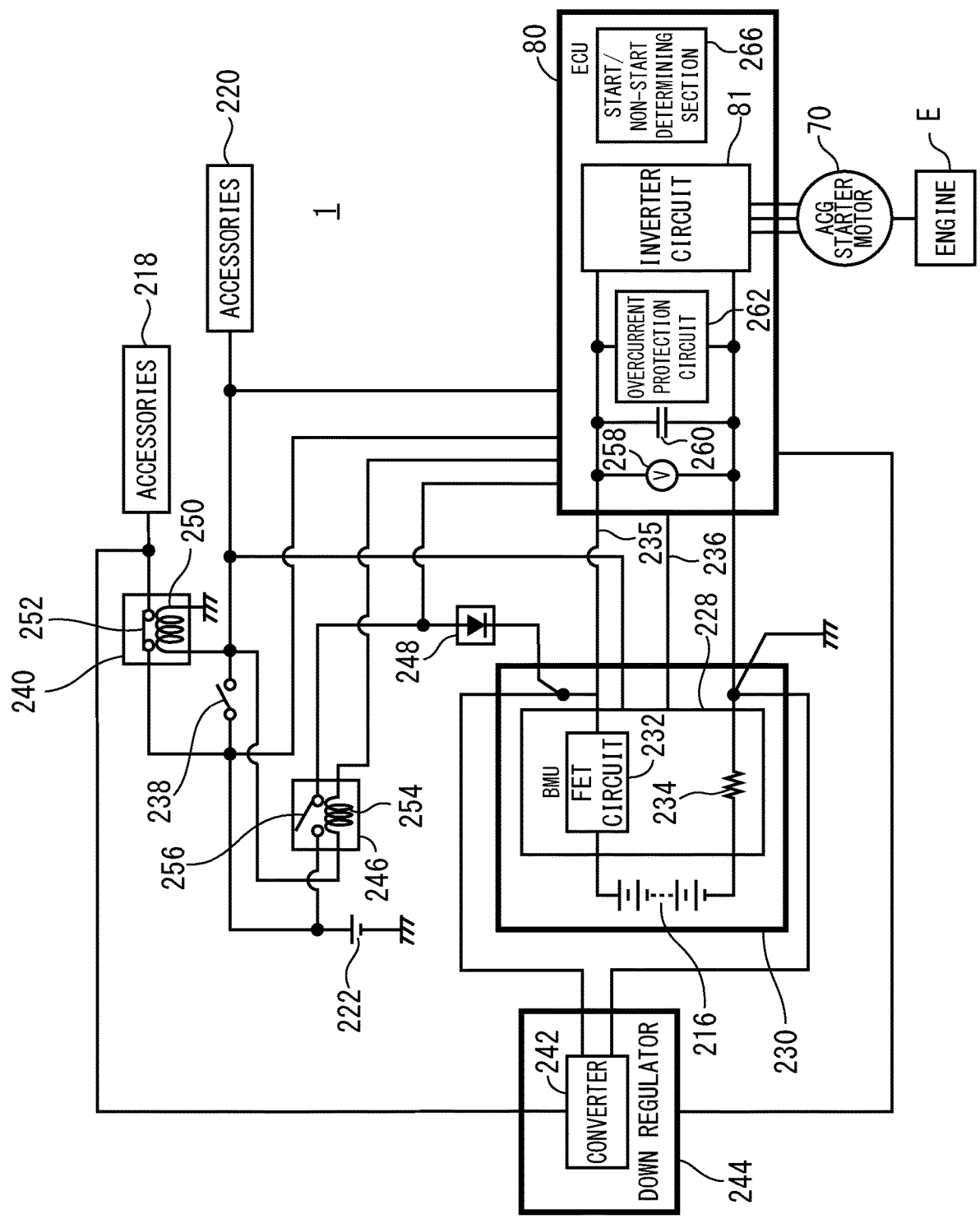
FIG. 4 is a diagram illustrating the hybrid configuration including two batteries that have the different rated voltage values, in the engine start control device according to the present embodiment.

FIG. 4 is a diagram illustrating the hybrid configuration including the first battery and the second battery that have the different rated voltage values, combined with the engine start control device 80 that is incorporated in the vehicle 1 according to the present embodiment.

The vehicle 1 includes the ACG starter motor 70, i.e., a drive motor, the first battery 216 having a high voltage, e.g., 48 V, for supplying electric power to the ACG starter motor 70, the second battery 222 having a low voltage, e.g., 12 V, for supplying electric power to a plurality of accessories 218 and 220, and the engine E that is started by the ACG starter motor 70 when the latter is energized.

The first battery 216 is a main battery, whereas the second battery 222 is an auxiliary battery. The ACG starter motor 70 is energized and the engine E is started under the control of the ECU 80, i.e., the engine start control device 80. The first battery 216 may be a Li ion battery, a Ni-MH battery, or a Ni—Cd battery, for example. The second battery 222 may be a Pb battery, for example.

For the engine start control device 80, the first battery 216 and a battery management unit (BMU) 228 serve together as a battery pack 230. The BMU 228 monitors the state of the first battery 216 and has a field-effect transistor (FET) circuit 232 including an FET and a diode, not illustrated. The BMU 228 and the ECU 80 are connected parallel to the first battery 216. The FET circuit 232 is connected to the positive pole of the first battery 216 whose negative pole is connected to ground through a resistor 234. When the FET of the FET circuit 232 is turned on, the first battery 216 can supply electric power to the ECU 80 through the FET circuit 232 and a line 235 connected to the positive pole of the first battery 216. The BMU 228 and the ECU 80 can send and receive signals therebetween via a controller area network (CAN) communication line 236. Therefore, the BMU 228 is able to notify the ECU 80 of the charged state, i.e., the battery charge level and the voltage value, of the first battery 216 via the CAN communication line 236.

The second battery 222 has a positive pole connected to the main switch 238. When the main switch 238 is turned on, the second battery 222 applies a direct-current (DC) voltage of 12 V through the main switch 238 to the accessory 220, the ECU 80, and the BMU 228, energizing the accessory 220, the ECU 80, and the BMU 228. The ECU 80 is able to monitor the DC voltage of the second battery 222.

Examples of the accessory 220 illustrated in FIG. 4 include the standby indicator 38, the fuel indicator 39, and the vehicle speed sensor 40 illustrated in FIG. 3.

The second battery 222 is connected through a main relay 240 to the accessory 218 and a down regulator 244 having a converter 242. The second battery 222 is also connected through a starter relay 246 and a diode 248, i.e., backflow prevention means, to the output of the BMU 228 on the line 235.

The main relay 240 has a solenoid coil 250 and a normally closed contact 252. The starter relay 246 has a solenoid coil 254 and a normally open contact 256. The normally closed contact 252 connects the positive pole of the second battery 222 to the accessory 218 and the converter 242. The solenoid coil 250 has an end connected to ground and the other end connected to the main switch 238. The normally open contact 256 connects the positive pole of the second battery 222 to the anode of the diode 248. The solenoid coil 254 connects the main switch 238 to the ECU 80.

When no voltage is applied to the solenoid coil 250, the normally closed contact 252 remains closed. Therefore, the DC voltage of the second battery 222 is applied through the normally closed contact 252 to the accessory 218, energizing the accessory 218.

An example of the accessory 218 illustrated in FIG. 4 includes the headlight 42 illustrated in FIG. 3.

When the ECU 80 supplies no exciting signal to the solenoid coil 254, the normally open contact 256 remains open. When the ECU 80 supplies an exciting signal to the solenoid coil 254, the normally open contact 256 is closed, allowing the second battery 222 to supply electric power to the ECU 80 through the normally open contact 256, the diode 248, and the line 235.

The diode 248 has its anode connected to the second battery 222 and its cathode connected to the first battery 216. Consequently, the diode 248 prevents a current from flowing from the higher-voltage first battery 216 to the lower-voltage second battery 222. The anode of the diode 248 is connected to the ECU 80, which is able to monitor the voltage on the anode of the diode 248.

The converter 242 of the down regulator 244 has a positive pole connected to the line 235 and a negative pole connected to ground. The converter 242 steps down the voltage from the line 235, i.e., the DC voltage of the first battery 216, and supplies the stepped-down voltage to the first battery 216 through the normally closed contact 252 of the main relay 240 or to the accessory 218. Thus, the first battery 216 is charged or the accessory 218 is energized. The down regulator 244 is connected to the ECU 80, which is able to monitor the down regulator 244.

The ECU 80 includes a voltage sensor 258, i.e., detecting means, a capacitor 260, an overcurrent protection circuit 262, and the inverter circuit 81 that are connected parallel to the BMU 228. The voltage sensor 258 detects a voltage in the ECU 80, i.e., the voltage across the capacitor 260 in FIG. 4.

With respect to the engine start control device 80, the voltage sensor 258 may be included in the BMU 228. In this case, the voltage sensor 258 may be included in the BMU 228 as a substitute for the voltage sensor 258 in the ECU 80. Alternatively, the voltage sensor 258 may be included in both the ECU 80 and the BMU 228. If the voltage sensor 258 is included in the BMU 228, then the voltage sensor 258 may be connected between the line 235 and ground and may detect a voltage in the ECU 80, i.e., the voltage across the capacitor 260, through the line 235. The BMU 228 may then notify the ECU 80 of the voltage detected by the voltage sensor 258 through the CAN communication line 236. Hereinafter, a case in which the voltage sensor 258 is included in the ECU 80 will be described below.

The inverter circuit 81 is constructed as a three-phase full-wave rectifying circuit having six FETs (see FIG. 5 to be described later) with parasitic diodes formed between the sources and drains of the respective FETs. For energizing and controlling the ACG starter motor 70 which is a three-phase brushless motor generator, the inverter circuit 81 converts the DC voltage supplied from the first battery 216 into three-phase alternating-current (AC) electric power, and supplies the three-phase AC electric power to the ACG starter motor 70 to energize the ACG starter motor 70 as a motor. The ACG starter motor 70 can now start the engine E or assist the engine E in producing drive power.

When in a regenerative mode, the ACG starter motor 70 functions as a generator, which converts kinetic energy into three-phase AC electric power. The inverter circuit 81 converts the three-phase AC electric power into a DC voltage that is smoothed by the capacitor 260 and applied to charge the first battery 216.

The ECU 80 energizes and controls the ACG starter motor 70 when an energization controller 85 to be described later with reference to FIG. 5 switches the FETs at a predetermined duty ratio.

The ECU 80 includes the start/non-start determining section 266. The start/non-start determining section 266 determines whether the battery charge level of the first battery 216 that has been indicated by the BMU 228 through the CAN communication line 236 is a battery charge level incapable of energizing the ACG starter motor 70, i.e., of starting the engine E, or not. If the start/non-start determining section 266 determines that the present battery charge level of the first battery 216 is unable to start the engine E, then the ECU 80 supplies electric power from the second battery 222 thereto to start the engine E.

Actually, the battery charge level of the first battery 216 varies depending on the temperature of the first battery 216. Actually, therefore, a temperature sensor, not illustrated, detects the temperature of the first battery 216, and the start/non-start determining section 266 determines whether the battery charge level of the first battery 216 is a battery charge level, depending on the temperature, required to start the engine E or not. Hereinafter, the start/non-start determining section 266 will be described as determining whether the battery charge level of the first battery 216 is a battery charge level required to start the engine E in view of the temperature of the first battery 216 or not.

With respect to the engine start control device 80, the start/non-start determining section 266 may be included in the BMU 228. Specifically, since the BMU 228 monitors the state of the first battery 216, the start/non-start determining section 266 may be included in the BMU 228, and the BMU 228 may also perform a process of determining whether the battery charge level of the first battery 216 is a battery charge level required to start the engine E or not. In this case, the BMU 228 notifies the ECU 80 of the determined result of the start/non-start determining section 266 through the CAN communication line 236. Hereinafter, a case in which the start/non-start determining section 266 is included in the ECU 80 will be described below.

The start/non-start determining section 266 may also be able to perform a process of monitoring not only the battery charge level of the first battery 216, but also the battery charge level of the second battery 222, and determining whether the battery charge level of the first battery 216 or the second battery 222 is a battery charge level required to start the engine E or not. In this case, a voltage sensor and a current sensor, not illustrated, may detect the voltage value and the current value, respectively, of the second battery 222, and the start/non-start determining section 266 may calculate the battery charge level of the second battery 222 from the detected voltage and current values and may perform the above determining process on the second battery 222.

A determining process performed by the start/non-start determining section 266 is not limited to the determining process on the battery charge level of the first battery 216 or the second battery 222. The start/non-start determining section 266 may be able to determine whether the state of the first battery 216 or the second battery 222 is a state capable of starting the engine E or not. Specifically, the start/non-start determining section 266 can perform a determining process on the voltage value of the first battery 216 or the second battery 222 or a determining process on a failure state of the first battery 216 or the second battery 222, for example, other than the above determining process on the battery charge level.

In this case, for example, the BMU 228 may detect the voltage value of the first battery 216, detect whether a failure state of the first battery 216 has occurred or not, and notify the ECU 80 of the detected voltage value and the detected result as to whether a failure state of the first battery 216 has occurred or not, through the CAN communication line 236.

In the determining process on the voltage value of the first battery 216 or the second battery 222, the start/non-start determining section 266 determines whether the voltage value of the first battery 216 or the second battery 222 is lower than a predetermined setting value or not, and, if the voltage value of one of the batteries is lower than the setting value, decides to start the engine E with the other battery. The predetermined setting value refers to a battery voltage value enough to start the engine E, for example.

In the determining process on a failure state of the first battery 216 or the second battery 222, the start/non-start determining section 266 determines whether the first battery 216 or the second battery 222 is in a failure state or not, and, if one of the batteries is in a failure state, decides to start the engine E with the other battery.

Figure 5:
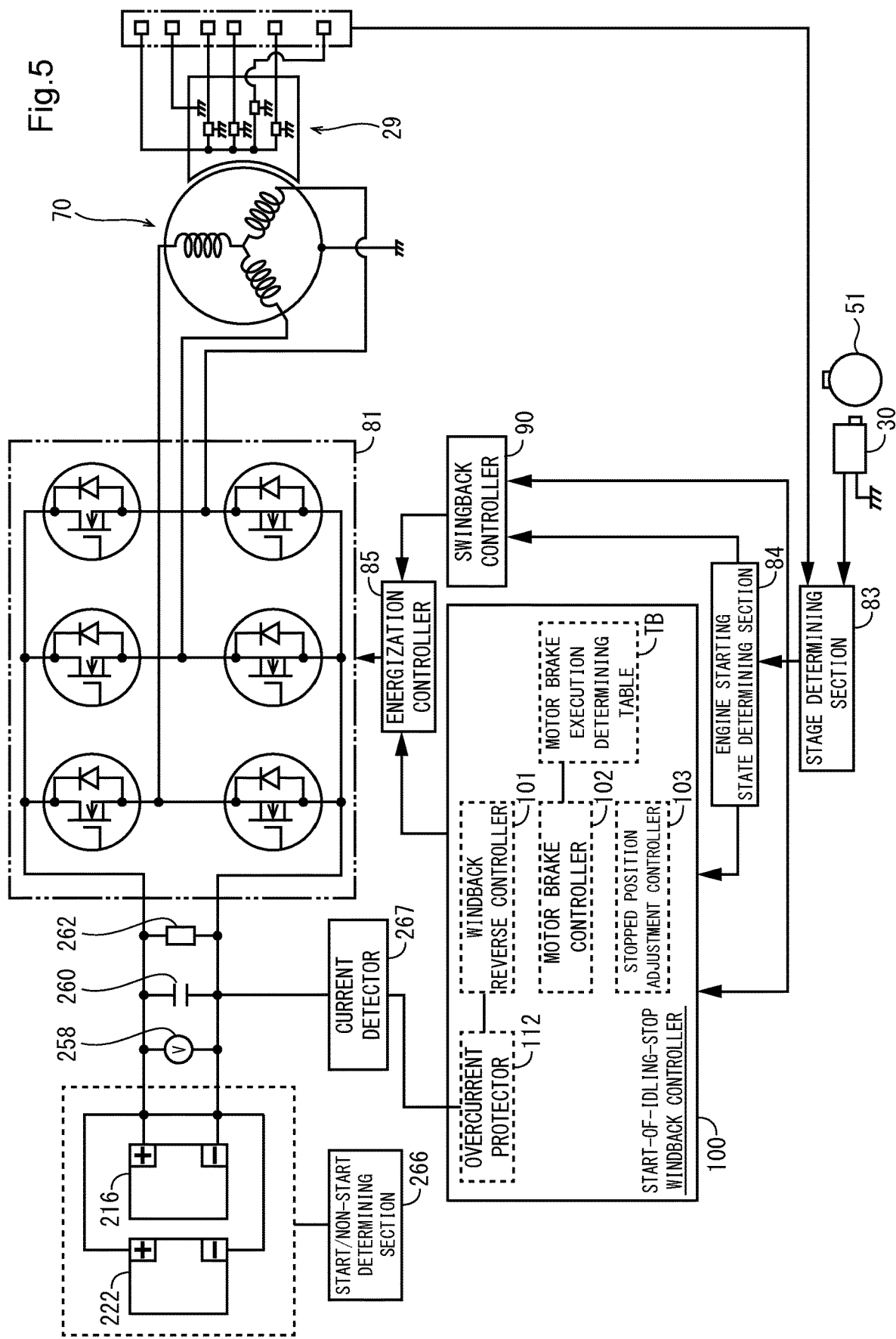
FIG. 5 is a block diagram illustrating the makeup of a major portion of the ECU (an engine start control device), for energizing and controlling the ACG starter motor.

FIG. 5 is a block diagram illustrating the makeup of a major portion of the ECU 80, i.e., the engine start control device 80, for energizing and controlling the ACG starter motor 70. The inverter circuit 81 includes three parallel-connected sets of two series-connected power FETs. The smoothing capacitor 260 is connected between the first battery 216 and the second battery 222, either one of which supplies electric power depending on the determined result from the start/non-start determining section 266, and the inverter circuit 81.

A stage determining section 83 divides two revolutions of the crankshaft 51 into 72 stages ranging from stages #0 through #71, i.e., motor stages over 720 degrees, based on output signals from the motor angle sensor 29 and the ignition pulser 30, determines a present stage, and outputs the determined result to an engine starting state determining section 84, the swingback controller 90, and the start-of-idling-stop windback controller 100. After the engine has started until an engine stroke is determined based on an output value of a PB sensor, etc., i.e., until a former or latter part of the two revolutions of the crankshaft 51 is determined, a stage is determined from 36 stages ranging from stages #0 through #35, i.e., motor stages over 360 degrees, divided from one revolution of the crankshaft 51. The ignition pulser 30 is integrally combined with the motor angle sensor 29 for the ACG starter motor 70, and detects an angular displacement of the ACG starter motor 70 mounted on the crankshaft 51.

The ECU 80, i.e., the engine start control device 80, according to the present embodiment is capable of performing a start-of-engine swingback control process that, when the starter switch 35 (see FIG. 3) is operated to start the engine E from a stopped state, reverses the crankshaft 51 to a predetermined position, or stated otherwise, swings back the crankshaft 51 to the predetermined position, and then starts to rotate the crankshaft 51 in the normal direction, thereby increasing a run-up period up to the compression-stroke top dead center to increase the rotational speed of the crankshaft 51 for going through the compression-stroke top dead center for the first time. The start-of-engine swingback control process makes it possible to increase the startability of the engine at the time the engine is started using the starter switch 35.

The ECU 80 is also capable of performing an idling stop control process for temporarily stopping the engine if predetermined conditions are satisfied while the vehicle is being stopped to wait for a traffic light, for example. The predetermined conditions to be satisfied to start an idling stop include, for example, a state in which the idling stop control process permission switch 26 is on, a state in which the seat switch 25 detects the rider seated on the seat 8, a state in which the vehicle speed detected by the vehicle speed sensor 40 is equal to or lower than a predetermined speed, e.g., 5 km/h, a state in which the engine rotational speed detected by the ignition pulser 30 is equal to or lower than a predetermined value, i.e., 2000 rpm, a state in which the throttle opening detected by the throttle opening sensor 23 is equal to or smaller than a predetermined value, e.g., 5 degrees, and a state in which a predetermined time has elapsed in all of these states. The ECU 80 restarts the engine E if the throttle opening becomes equal to or larger than the predetermined value during the idling stop.

The ECU 80 according to the present embodiment is also capable of performing a start-of-idling-stop windback control process that, when the engine E is temporarily stopped if the idling stop conditions referred above are satisfied, reverses the crankshaft 51 from the stopped position to a predetermined position, or stated otherwise, winds back the crankshaft 51 to the predetermined position, thereby increasing a run-up period up to the compression-stroke top dead center to increase the startability of the engine E at the time the engine E is restarted. The start-of-idling-stop windback control process is not carried out when the engine E has been stopped by turning off the main switch 238.

The engine starting state determining section 84 determines whether the engine E is to be started by operating the starter switch 35, i.e., the engine E is to be started from a fully stopped state, or the engine E is to be restarted from an idling stop state by a throttle operation. If the engine starting state determining section 84 determines that the engine E is to be started from a fully stopped state, then the swingback controller 90 sets a duty ratio for reversing the ACG starter motor 70 and then carries out the swingback control process.

On the other hand, if the engine starting state determining section 84 determines that the engine E is to be restarted from an idling stop state, then a windback reverse controller 101 included in the start-of-idling-stop windback controller 100 sets a duty ratio for reversing the ACG starter motor 70 and then performs a windback control process. Then, after the windback control process, a motor brake controller 102 performs a motor brake control process by referring to a motor brake execution determining table TB. The motor brake control process can be performed by energization for rotation in the normal direction according to an embodiment or by short-circuit braking according to another embodiment. If it is determined that rollback occurs at the end of the motor brake control process, then a stopped position adjustment controller 103 performs a control process for reducing the rollback.

In the swingback control process, the energization controller 85 supplies drive pulses at the duty ratio set by the swingback controller 90 to the power FETs of the inverter circuit 81, swinging back the crankshaft 51. In the windback control process, the energization controller 85 supplies drive pulses at the duty ratio set by the start-of-idling-stop windback controller 100 to the power FETs of the inverter circuit 81, thereby performing the windback control process and the motor brake control process, and, in the event of rollback, a rollback control process, on the crankshaft 51.

The ECU 80, i.e., the engine start control device 80, according to the present embodiment is characterized in that the duty ratio for the swingback control process and the duty ratio set by the windback reverse controller 101 for the windback control process are different from each other. Specifically, the reverse duty ratio for the windback control process is set so as to be equivalent to or larger than the reverse duty ratio for the swingback control process. The duty ratio set to be equivalent or larger may be determined as equivalent or larger by a threshold value with respect to the set duty ratio.

For example, providing electric power is supplied from the first battery 216 in either of the control processes, the duty ratio for the swingback control process may be set to 25% and the duty ratio for the windback control process may be set to a value in a range from 30% to 40%. Providing electric power is supplied from the second battery 222 in either of the control processes, the duty ratio for the swingback control process may be set to 90% and the duty ratio for the windback control process may be set to 100%. If electric power is supplied from the different batteries in the swingback control process and the windback control process, the voltages may be converted into average voltages by being multiplied by the duty ratios, and the average voltage for the windback control process may be set to be equivalent to or larger than the average voltage for the swingback control process. For example, the duty ratio for the swingback control process may be set to 100% for energization by the second battery 222 (12 V), i.e., it may be set to 25% for energization by the first battery 216 (48 V), and the duty ratio for the windback control process may be set to a value in a range from 30% to 40% for energization by the first battery 216 (48 V).

The duty ratios whose magnitudes are thus set for the swingback control process and the windback control process may be corrected based on the engine temperature acquired by the coolant temperature sensor 27. For correcting the duty ratios based on the engine temperature, tables representing the relation between engine temperatures and duty ratios may be prepared respectively for the first battery 216 and the second battery 222, the duty ratios may be temperature-corrected by referring to the tables, and the duty ratios converted into those for a common temperature may be set so as to have the magnitudes described above.

The engine start control device 80, i.e., the ECU 80, according to the present embodiment is able to complete windback at the start of an idling stop earlier than the conventional process, thereby restarting the engine E from the idling stop earlier than the conventional process, by making the duty ratio for the windback control process larger than the duty ratio for the swingback control process.

Furthermore, the engine start control device 80, i.e., the ECU 80, according to the present embodiment is characterized in that it performs the motor brake control process when the motor brake controller 102 applies a torque to the crankshaft 51 in a direction to rotate it in the normal direction or performs a short-circuit braking control process immediately after the completion of the control process performed by the windback reverse controller 101 to reverse the crankshaft 51 (at the time of the completion of the control process, the crankshaft 51 has been reversed) in order to prevent the crank position from going through the compression-stroke top dead center because of the large duty ratio set as described above.

Processing sequences of the swingback controller 90 and the start-of-idling-stop windback controller 100 will hereinafter be described below.

The swingback control process of the swingback controller 90 is carried out when the engine starting state determining section 84 determines that the swingback control process is to be started. When the starter switch 35 is turned on at a certain time while the engine E is in its fully stopped state, not when the engine E is restarted from an idling stop state, the engine starting state determining section 84 determines that the swingback control process is to be started at the time. When the engine starting state determining section 84 determines that the swingback control process is to be started at the time, the swingback controller 90 sets a duty ratio for the swingback control process as a value equal to or smaller than a duty ratio for the windback control process at the start of an idling stop, and reverses the ACG starter motor 70 at the set duty ratio.

When the stage determining section 83 detects a predetermined position subsequent to the compression-stroke top dead center upon the reversing of the ACG starter motor 70, the swingback control process carried out by the swingback controller 90 is finished. Although a corresponding arrangement is not illustrated in FIG. 5, after the swingback control process is finished, the ECU 80 starts to energize the ACG starter motor 70 to rotate in the normal direction, and starts a fuel injection control process and an ignition control process, starting the engine E.

Figure 6:
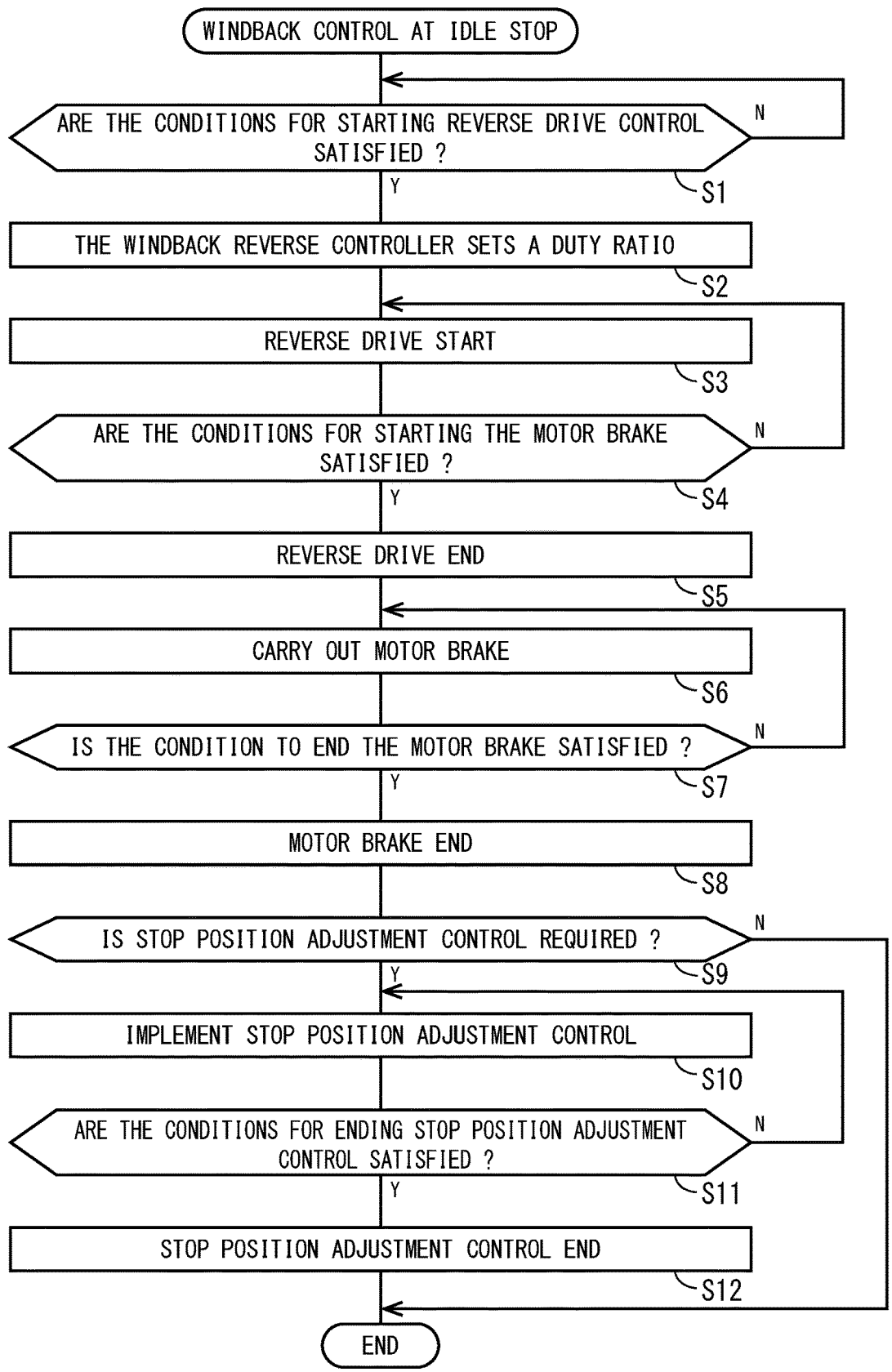
FIG. 6 is a flowchart of the windback control process of the start-of-idling-stop windback controller according to the embodiment.

FIG. 6 is a flowchart of the windback control process of the start-of-idling-stop windback controller 100 according to the embodiment.

In step S1, the engine starting state determining section 84 determines whether conditions for staring the start-of-idling-stop windback control process have been satisfied or not. If the conditions are satisfied, then control goes to step S2. If the conditions are not satisfied, then control waits in step S1.

The conditions for staring the start-of-idling-stop windback control process in step S1 include (1) a state in which the idling stop control process has been started with the above idling stop conditions being already satisfied and (2) a state in which the crankshaft 51 has been detected as stopped.

In step S2, the windback reverse controller 101 sets a duty ratio for the windback control process as a value equal to or larger than a duty ratio for the swingback control process, corrected depending on the engine temperature based on the output from the coolant temperature sensor 27 (FIG. 3), as described above. Then, control goes to step S3.

In step S3, the windback reverse controller 101 causes the energization controller 85 to reverse the ACG starter motor 70 at the large duty ratio for the windback control process set in step S2. Then, control goes to step S4.

While the ACG starter motor 70 is being reversed in step S3, a monitoring process may continuously be performed concurrently by a current detector 267 and an overcurrent protector 112 to prevent motor currents supplied to reverse the ACG starter motor 70 from increasing to or larger than a predetermined value. Specifically, the current detector 267 detects phase currents flowing from the ECU 80 to the ACG starter motor 70. If the phase currents are equal to or larger than a predetermined value, then the overcurrent protector 112 instructs the windback reverse controller 101 to temporarily lower the duty ratio.

Alternatively, rather than restraining the large current with energizing and controlling by the current detector 267 and the overcurrent protector 112, the large current may be restrained as follows: The overcurrent protection circuit 262 may be arranged to function as a shunt in the event that phase current equal to or larger than a predetermined value are detected, allowing certain currents to flow from the ACG starter motor 70 to the overcurrent protection circuit 262 when it function as the shunt. The phase currents may be detected as currents between the capacitor 260 and the FETs of the inverter circuit 264.

In step S3, the following additional process may be carried out: If it is determined that the crank position obtained at the time by the stage determining section 83 exceeds a predetermined position near the compression-stroke top dead center, e.g., a position at 250 degrees in a case in which the compression-stroke top dead center is at 0 degrees, i.e., approaches the compression-stroke top dead center by exceeding the predetermined position in the reversing direction, then the windback reverse controller 101 may set the duty ratio at which the energization controller 85 reverses the ACG starter motor 70 to a value smaller than the value set in step S2, and continuously reverse the ACG starter motor 70. The smaller value may be the duty ratio used as a base value by the swingback controller 90. By thus setting the duty ratio for reversing the ACG starter motor 70 to a value smaller than the initial value when it is determined that the crank position approaches the compression-stroke top dead center, the crankshaft 51 can be wound back at a high speed and effectively prevented from being reversed beyond the compression-stroke top dead center.

In step S4, the motor brake controller 102 determines whether a condition for starting the motor brake control process is satisfied or not by referring to the crank position obtained at the time by the stage determining section 83, i.e., the 72 stages ranging from stages #0 through #71 referred to above, and the speed of the reversed rotation of the crankshaft 51, in the motor brake execution determining table TB. If the condition is satisfied, then control goes to step S5. If the condition is not satisfied, then control returns to step S3, in which the windback reverse controller 101 continues to reverse the ACG starter motor 70. Accordingly, as long as the answer to step S4 is negative, the windback reverse controller 101 continues to reverse the ACG starter motor 70. In step S5, the windback reverse controller 101 finishes the reversing of the ACG starter motor 70, after which control goes to step S6.

Figure 7:
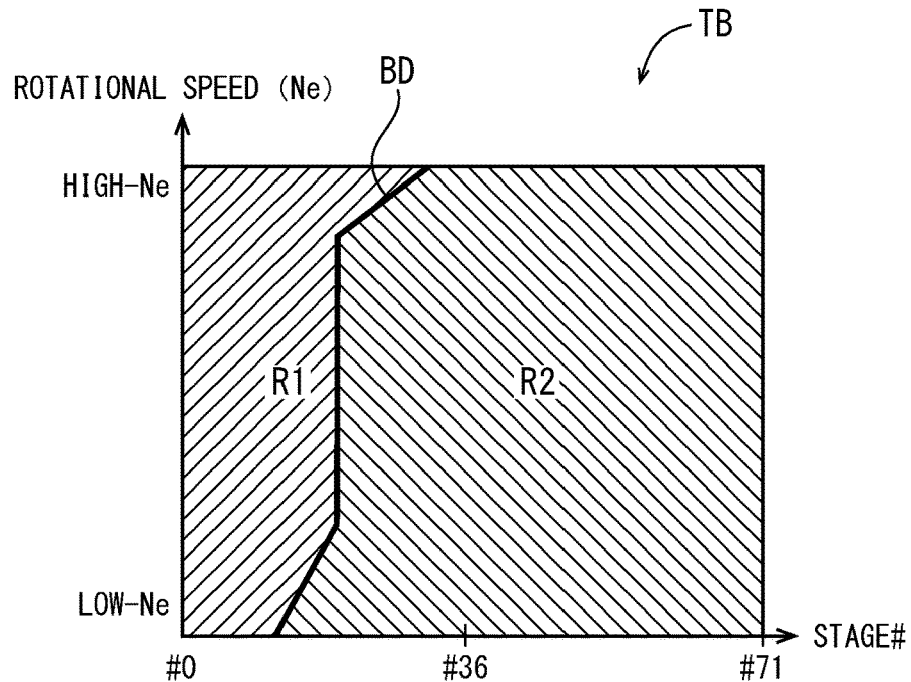
FIG. 7 is a schematic diagram illustrating by way of example the motor brake execution determining table.

FIG. 7 is a schematic diagram illustrating by way of example the motor brake execution determining table TB that the motor brake controller 102 refers to in determining whether the condition for starting the motor brake control process is satisfied or not in step S4 described above. As illustrated in FIG. 7, an area close to the stage #0 at the compression-stroke top dead center is defined as a motor brake region R1, and an area including the stages #36 through #71 far from the compression-stroke top dead center is defined as a reverse drive region R2. The motor brake execution determining table TB is arranged such that the higher the rotational speed (Ne) of the crankshaft 51 is, the larger the stage # is, i.e., the farther from the compression-stroke top dead center #0 the stage # is, where the reverse drive region R2 changes to the motor brake region R1 across a boundary BD between the motor brake region R1 and the reverse drive region R2.

In step S4, the motor brake controller 102 refers to the motor brake execution determining table TB, and makes an affirmative decision if the pair of values, i.e., the stage # and the rotational speed, at the time belongs to the motor brake region R1 in the motor brake execution determining table TB, and makes a negative decision if the pair of values belongs to the reverse drive region R2.

Figure 8:
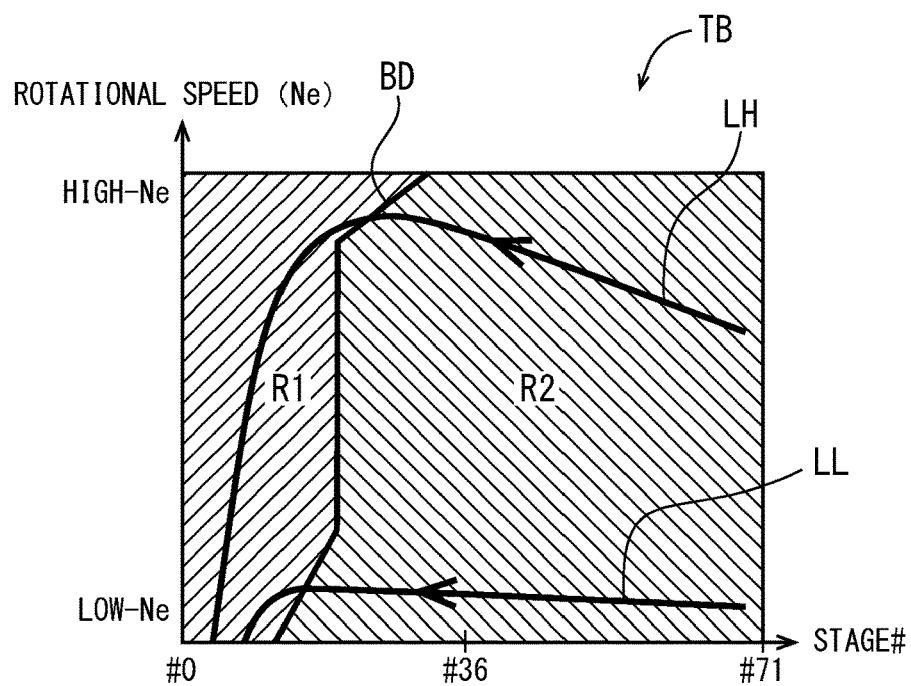
FIG. 8 is a schematic diagram illustrates by way of example a state transition over the motor brake execution determining table illustrated in FIG. 7.

FIG. 8 illustrates by way of example a state transition LH where the rotational speed of the crankshaft 51 is higher and a state transition LL where the rotational speed of the crankshaft 51 is lower, plotted over the motor brake execution determining table TB illustrated in FIG. 7. As illustrated in FIG. 8, when the rotational speed of the crankshaft 51 is higher, the reverse drive region R2 changes to the motor brake region R1 at a certain time in a larger stage #, i.e., farther from the compression-stroke top dead center #0, and when the rotational speed of the crankshaft 51 is lower, the reverse drive region R2 changes to the motor brake region R1 at a certain time in a smaller stage #, i.e., closer to the compression-stroke top dead center #0. According to the motor brake control process carried out in step S6, to be described below, by the motor brake controller 102 based on the motor brake execution determining table TB, the reversing of the ACG starter motor 70 that has been continued thus far is finished at an appropriate timing depending on the rotational speed of the crankshaft 51, and at the same time the motor brake control process is started by energizing the ACG starter motor 70 to rotate in the normal direction or performing short-circuit braking thereon. The crank position is thus prevented from going beyond the compression-stroke top dead center.

The motor brake execution determining table TB may be arranged as a three-dimensional map including those data illustrated in FIG. 7 and those depending on the engine temperature based on the output from the coolant temperature sensor 27.

Referring back to steps illustrated in FIG. 6, in step S6, the motor brake controller 102 controls the ACG starter motor 70 through the energization controller 85, performing the motor brake control process. Then, control goes to step S7.

As described above, the motor brake control process in step S6 can be performed by either rotating the ACG starter motor 70 in the normal direction or short-circuit braking on the ACG starter motor 70. For rotating the ACG starter motor 70 in the normal direction, the ACG starter motor 70 may be energized to rotate in the normal direction at a predetermined duty ratio in step S6. According to an embodiment, the duty ratio at which the motor brake controller 120 rotates the ACG starter motor 70 in the normal direction in step S6 may be set to a value equal to the reversing duty ratio set in step S1 and used in step S3 by the windback reverse controller 101.

For performing the motor brake control process based on short-circuit braking in step S6, the energization controller 85 may short-circuit the three phases of the inverter 81, i.e., may turn on all the FETs, i.e., switching elements, of three phases U, V, and W of the inverter 81 to short-circuit them. The short-circuited three phases develop circuit loops to obtain currents in the same directions as when the ACG starter motor 70 is energized to rotate in the normal direction, making it possible to brake the ACG starter motor 70.

Presettings may be made as to whether the motor brake controller 102 is to perform the motor brake control process by either rotating the ACG starter motor 70 in the normal direction or short-circuit braking on the ACG starter motor 70 in step S6. Different motor brake execution determining tables TB may be referred to respectively in rotating the ACG starter motor 70 in the normal direction and short-circuit braking on the ACG starter motor 70.

In step S7, the motor brake controller 102 determines whether a condition for finishing the motor brake control process is satisfied or not. If the condition is satisfied, then control goes to step S8. If the condition is not satisfied, then control returns to step S6, in which the motor brake controller 102 continues the motor brake control process.

The condition for finishing the motor brake control process in step S7 may be that the time for which the motor brake control process continued in step S5 has been continued has reached a predetermined value or the stage # obtained by the stage determining section 83 has reached a predetermined range close to the compression-stroke top dead center, after the affirmative answer to step S4 has been obtained.

In step S8, the motor brake controller 102 finishes the motor brake control process. Then, control goes to step S9.

In step S9, the stopped position adjustment controller 103 determines whether there is rollback or not. If there is rollback, control goes to step S10. If there is no rollback, the flowchart illustrated in FIG. 6 is ended. The stopped position adjustment controller 103 determines whether there is rollback or not in step S9 as follows: If the rotation of the crankshaft 51 based on the stage # obtained by the stage determining section 83 at the time is in the normal direction as determined by a threshold value, then the stopped position adjustment controller 103 may determine that there is rollback. Otherwise, the stopped position adjustment controller 103 may determine that there is no rollback.

In step S10, the stopped position adjustment controller 103 performs a control process for energizing the ACG starter motor 70 to rotate in the normal direction as a control process for restraining rollback through the energization controller 85, i.e., a stopped position adjustment control process for the crankshaft 51. Then, control goes to step S11.

In step S11, the stopped position adjustment controller 103 determines whether a condition for finishing the stopped position adjustment control process is satisfied or not. If the condition is satisfied, then control goes to step S12. If the condition is not satisfied, then control returns to step S11 for the stopped position adjustment controller 103 to continue the stopped position adjustment control process. In step S12, the stopped position adjustment controller 103 finishes the stopped position adjustment control process. Then, the flowchart illustrated in FIG. 6 is ended.

The stopped position adjustment control process that is performed by the stopped position adjustment controller 103 in step S10 may apply motor brake forces stepwise by reducing a plurality of duty ratios stepwise, in the same manner as the motor brake means disclosed in PTL 1 described above. The application of the motor brake forces stepwise may be such that motor brake forces are continued at a first larger duty ratio for a first time, and thereafter motor brake forces are continued at a second smaller duty ratio for a second time, whereupon it is determined that the stopped position adjustment control process is to be finished in step S11.

The steps illustrated in FIG. 6 as an embodiment of operation of the start-of-idling-stop windback controller 100 have been described above. Although a corresponding arrangement is not illustrated in FIGS. 5 and 6, after the start-of-idling-stop windback control process is finished, i.e., the flowchart illustrated in FIG. 6 is finished, using an operation of a throttle grip, i.e., an operation to open the throttle grip to an opening equal to or larger than a predetermined opening, as a trigger, the ACG starter motor 70 is started to rotate in the normal direction, and a fuel injection control process and an ignition control process are started at a high speed based on a stage stored at the time the start-of-idling-stop windback control process is finished, thereby starting the engine E.

Furthermore, according to an additional embodiment with respect to the flowchart illustrated in FIG. 6, while the motor brake control process is being continued in steps S6 and S7 and the finishing condition in step S7 is not satisfied, if the crankshaft position and the crankshaft rotational speed have returned to the reverse drive region R2 (FIG. 7) at the time obtained by the stage determining section 83, then the control process for reversing the crankshaft 51 may be performed again. In other words, if it is additionally determined in step S7 that the crankshaft position and the crankshaft rotational speed have returned to the reverse drive region R2 (FIG. 7), then control may go back to step S3 in FIG. 6.

Figure 9:
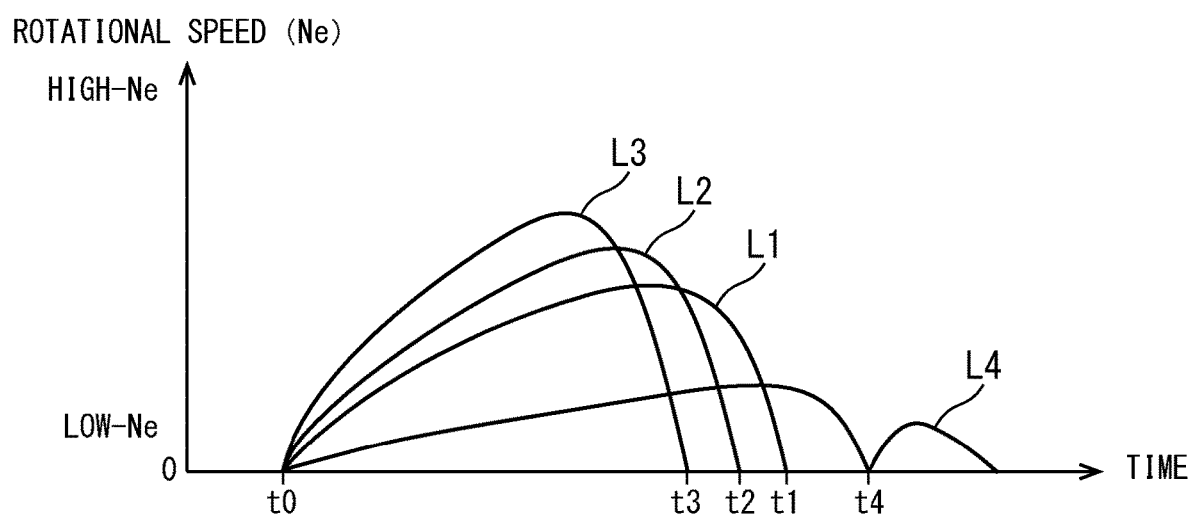
FIG. 9 is a schematic diagram illustrating effects of the start-of-idling-stop windback controller according to the present invention.

FIG. 9 is a schematic diagram illustrating effects of the start-of-idling-stop windback controller 100 according to the present invention. FIG. 9 illustrates a graph having a vertical axis representing the rotational speed, i.e., the absolute value thereof, of the crankshaft 51 and a horizontal axis representing time. The graph illustrates curves L1, L2, and L3 representing the control process performed by the start-of-idling-stop windback controller 100 at duty ratios of 25%, 30%, and 35%, respectively. Time t0 is a time at which the ACG starter motor 70 starts to be reversed after the answer to step S1 in FIG. 6 has become affirmative. It can be seen from the graph that as the duty ratio goes higher, the rotational speed of the reversed ACG starter motor 70 rises to a higher value, the motor brake control process starts to reduce the rotational speed at an earlier time, and the time at which to finish the motor brake control process, i.e., the time at step S8 in FIG. 6 becomes earlier, e.g., from time t1 to time t2 to time t3.

FIG. 9 illustrates a graph illustrating a curve L4 representing the windback control process with a duty ratio, e.g., 10%, smaller than a duty ratio, e.g., 20%, of the swingback control process according to the conventional art, as compared to the control process performed by the start-of-idling-stop windback controller 100 according to the present invention. The windback control process starts at common time to. According to the conventional art represented by the curve L4, the windback control process is finished at time t4 that is later than times t1, t2, and t3 according to the present invention. According to the curve L4, rollback is restrained with the rotational speed for the rotation in the normal direction, subsequent to time t4.

In FIG. 9, though changes are omitted from illustration after times t1, t2, and t3 according to the curves L1, L2, and L3 to which the present invention is applied, the stopped position adjustment controller 103 may perform its control process in the event of rollback. Since times t1, t2, and t3 are earlier than time t4, it is possible to finally complete the control process for restraining rollback earlier than the conventional art even if rollback is restrained.

According to the present invention, the relation between the setting of the windback reverse controller 101 and the setting of the swingback controller 90 has been described as the magnitude relation between the duty ratios at which the energization controller 85 energizes and controls the inverter circuit 81 by way of pulse width modulation. However, the magnitude relation is equal to the magnitude relation between drive currents that are set for the energization controller 85 to energize and control the inverter circuit 81. Specifically, for the windback reverse controller 101 and the swingback controller 90 to energize and control the inverter circuit 81, the magnitude relation between the duty ratios is equal to the magnitude relation between drive currents that are set, on the premise that either the first battery 216 or the second battery 222 is used in common. Furthermore, for the windback reverse controller 101 and the swingback controller 90 to energize and control the inverter circuit 81, even if the first battery 216 is used by one of them and the second battery 222 is used by the other, the magnitude relation between the duty ratios becomes equal to the magnitude relation between drive currents (averages values) that are set, by converting the drive currents into average currents in the same manner as the conversion into average voltages as described above.

REFERENCE SIGNS LIST

E . . . engine
51 . . . crankshaft
70 . . . ACG starter motor
80 . . . engine start control device
35 . . . starter switch
90 . . . swingback controller
101 . . . windback reverse controller
102 . . . motor brake controller
103 . . . stopped position adjustment controller
216 . . . first battery
222 . . . second battery
262 . . . overcurrent protection circuit
TB . . . motor brake execution determining table
R1 . . . motor brake region
R1 . . . reverse drive region

The invention claimed is:

1. An engine start control device for performing an idling stop control process for automatically stopping an engine when a predetermined condition is satisfied and for reversing a crankshaft after the engine is stopped with a motor that rotates the crankshaft in a normal direction or reverses the crankshaft, wherein the engine start control device is an Electronic Control Unit (ECU) connected to a plurality of sensors and switches, and comprising a processor which receives inputs from the plurality of sensors and switches, and is programmed to operate as:

a swingback controller performing a swingback control process for reversing the crankshaft when the engine is started by operating a starter switch;

a windback reverse controller performing a windback control process for reversing the crankshaft immediately after the engine is stopped by the idling stop control process; and a motor brake controller performing a motor brake control process for braking the crankshaft reversed by the windback control process after the windback control process performed by the windback reverse controller, wherein a value of a motor current supplied at a time the crankshaft is reversed by the windback reverse controller is set as a value equal to or larger than a value of a motor current supplied at a time the crankshaft is reversed by the swingback controller, wherein the engine start control device further comprises a storage storing a motor brake execution determining table having a motor brake region and a reverse drive region that are defined separately from each other depending on a position and a rotational speed of the crankshaft, wherein the motor brake controller monitors the position and rotational speed of the crankshaft at each point of time, and starts the motor brake control process when the monitored position and rotational speed are shifted into the motor brake region in the motor brake execution determining table, and wherein the motor brake execution determining table is defined such that the higher the rotational speed is, the farther a position of a boundary across which the reverse drive region transitions to the motor brake region becomes from a predetermined position corresponding to a compression-stroke top dead center of the engine.

2. The engine start control device according to claim 1, wherein the motor brake controller performs the motor brake control process by rotating the crankshaft in the normal direction.

3. The engine start control device according to claim 2, further comprising:

a first battery and a second battery having rated voltage values different from each other, for applying a drive voltage to the motor that rotates the crankshaft in the normal direction or reverses the crankshaft, wherein for energizing the motor, either the first battery or the second battery applies the drive voltage to the motor.

4. The engine start control device according to claim 2, further comprising:

an overcurrent protection circuit for shunting a current supplied from the windback reverse controller to energize the motor to reverse the crankshaft such that a value of the current supplied to reverse the crankshaft does not exceed a predetermined value.

5. The engine start control device according to claim 2, further comprising:

a stopped position adjustment controller for restraining rollback of the crankshaft by reversing the crankshaft if it is determined that the crankshaft rolls back in the normal direction after the motor brake control process performed by the motor brake controller is finished.

6. The engine start control device according to claim 1, wherein the motor brake controller performs the motor brake control process by short-circuit braking to short-circuit switching elements that energize the motor.

7. The engine start control device according to claim 6, further comprising:

a first battery and a second battery having rated voltage values different from each other, for applying a drive voltage to the motor that rotates the crankshaft in the normal direction or reverses the crankshaft, wherein for energizing the motor, either the first battery or the second battery applies the drive voltage to the motor.

8. The engine start control device according to claim 6, further comprising:

an overcurrent protection circuit for shunting a current supplied from the windback reverse controller to energize the motor to reverse the crankshaft such that a value of the current supplied to reverse the crankshaft does not exceed a predetermined value.

9. The engine start control device according to claim 6, further comprising:

a stopped position adjustment controller for restraining rollback of the crankshaft by reversing the crankshaft if it is determined that the crankshaft rolls back in the normal direction after the motor brake control process performed by the motor brake controller is finished.

10. The engine start control device according to claim 1, further comprising:

a first battery and a second battery having rated voltage values different from each other, for applying a drive voltage to the motor that rotates the crankshaft in the normal direction or reverses the crankshaft, wherein for energizing the motor, either the first battery or the second battery applies the drive voltage to the motor.

11. The engine start control device according to claim 10, further comprising:

an overcurrent protection circuit for shunting a current supplied from the windback reverse controller to energize the motor to reverse the crankshaft such that a value of the current supplied to reverse the crankshaft does not exceed a predetermined value.

12. The engine start control device according to claim 10, further comprising:

a stopped position adjustment controller for restraining rollback of the crankshaft by reversing the crankshaft if it is determined that the crankshaft rolls back in the normal direction after the motor brake control process performed by the motor brake controller is finished.

13. The engine start control device according to claim 1, further comprising:

an overcurrent protection circuit for shunting a current supplied from the windback reverse controller to energize the motor to reverse the crankshaft such that a value of the current supplied to reverse the crankshaft does not exceed a predetermined value.

14. The engine start control device according to claim 1, further comprising:

a stopped position adjustment controller for restraining rollback of the crankshaft by reversing the crankshaft if it is determined that the crankshaft rolls back in the normal direction after the motor brake control process performed by the motor brake controller is finished.

15. The engine start control device according to claim 1, wherein the windback reverse controller changes a value of a motor current supplied to reverse the crankshaft to a smaller value if it is determined that the position of the crankshaft approaches the compression-stroke top dead center of the engine when the crankshaft is reversed.

* * * * *